June 26, 1934.    H. HUEBER    1,964,401

WINDSHIELD CLEANER

Filed April 24, 1930

Inventor
Henry Hueber
By Bartow A. Beau Jr.
Attorney

Patented June 26, 1934

1,964,401

UNITED STATES PATENT OFFICE 1,964,401

WINDSHIELD CLEANER

Henry Hueber, Buffalo, N. Y., assignor to Trico Products Corporation, Buffalo, N. Y.

Application April 24, 1930, Serial No. 446,928

6 Claims. (Cl. 74—14)

This invention relates to a dual wiper windshield cleaner.

The usual windshield wiper of the oscillatory type will collect the moisture at the end of each stroke and immediately return whereby the collected moisture will flow back over the cleaned area and obscure a portion of the field of vision.

The present invention aims to overcome this by providing a novel wiper movement whereby the wiper is given an accelerated movement across the central portion of the area cleaned to obstruct the vision as little as possible; and to provide for an oscillatory wiper movement in which the wiper is given a retarded movement at the end of each stroke so that the collected moisture may run off from the lower end of the blade without returning to the cleaned area.

Further, the invention will be found to reside in the arrangement and combination of parts and their salient features of construction hereinafter described and claimed, reference being made to the drawing wherein;

Figure 1:
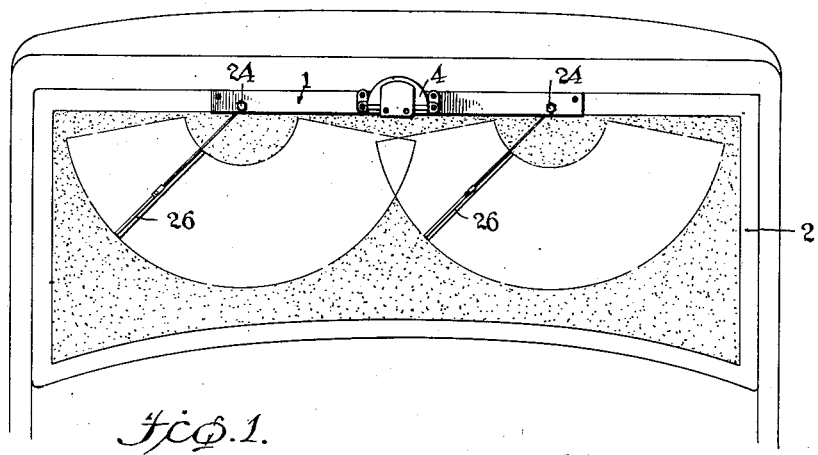
Fig. 1 is a view depicting the windshield of a motor vehicle equipped with my improved windshield cleaner.

Referring more in detail to the accompanying drawing, the numeral 1 designates a support or housing of a simple design adapted to be attached to the windshield 2 of the motor vehicle by suitable fastening elements 3. To the front wall of the housing, and substantially central thereof, is arranged the windshield cleaner motor 4 which is preferably of the fluid pressure or the so-called suction operated type, and has its driving or operating shaft 5 extended through an opening 6 in the front wall of the housing for supporting a disc-like crank arm 7, the latter being equipped with a pair of crank pins 8 which in turn are connected to the adjacent ends of the rack bars 9. The operating shaft has an oscillatory movement imparted thereto which is transformed by the crank into a reciprocatory motion for the rack bars 9.

A bearing disc 10 is threaded or passed over the crank pins to have guiding contact with the rack bars, a lubricating felt body 11 surmounting the disc for providing the necessary lubrication, and a retaining or locking disc 12 is then interlocked with reduced portions 14 of the crank pins so as to hold the assemblage in place. This locking disc is illustrated as comprising a slot having an intermediate entrance portion 13 which is passed over one of the crank pins and then shifted laterally to engage the reduced portion 14 of a pin in the narrowed end of the slot 13, following which the opposite reduced end portion of the slot is engaged with the reduced diameter of the companion crank pin. This is permitted by splitting the adjacent portion of the disc to its periphery, as indicated at 15, so that the adjacent portions of the disc may be sprung into interlocking engagement with the reduced diameter.

Figure 2:
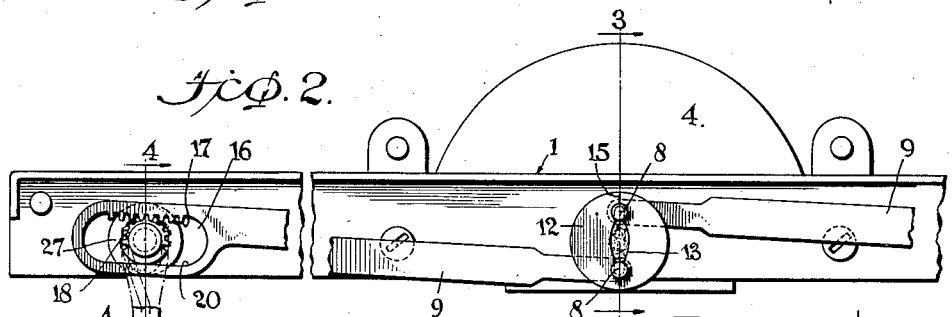
Fig. 2 is a broken elevation depicting the wiper drive from within the casing or housing.
Figure 3:
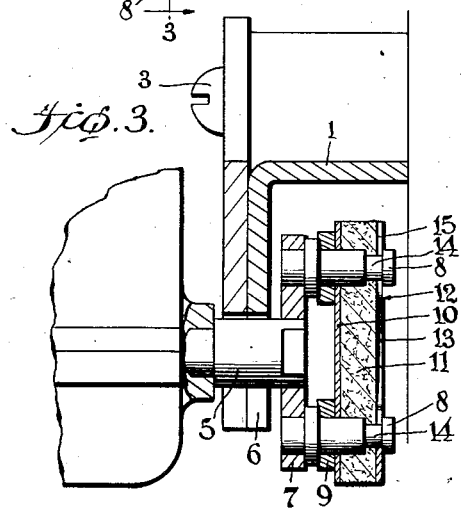
Fig. 3 is a transverse vertical sectional view about on line 3—3 of Fig. 2.
Figure 4:
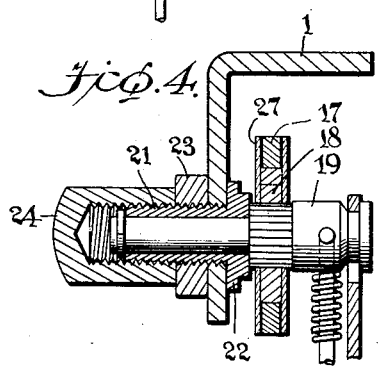
Fig. 4 is a similar view on about line 4—4 of Fig. 2.
Figure 5:
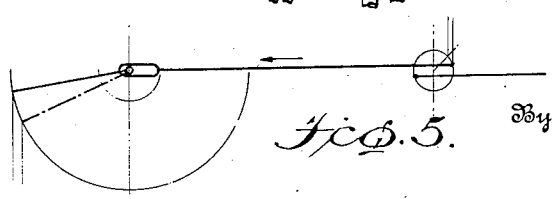
Fig. 5 is a diagrammatic showing more clearly illustrating the wiper movement.

The outer or remote ends of the rack bars are formed with longitudinal slots 16 having on one side an internal rack 17 for engaging a mutilated or interrupted pinion 18 on a wiper shaft 19, the opposite side 20 of the slot providing a smooth surface on which the pinion 18 may have sliding bearing. In order that the wiper blades 26 may move in parallel relation or phase synchronism in the manner indicated in Fig. 1, the rack formed at the outer end of one of the bars 9 is reversed with respect to the rack formed at the end of the other bar. That is, at the end of one bar 9 the rack 17 is formed along the upper side of the slot 16, while at the end of the other bar the corresponding rack is disposed along the lower side of the slot. The shaft 19 is journaled in a bearing sleeve 21 provided in the front wall of the housing 1, such bearing being in the nature of a sleeve having a flange 22 at its inner end and a retaining nut 23 threaded on the outer end and impinged against the front face of the housing so as to cooperate with the flange 22 in securing the bearing to the housing. A cap nut 24 threaded on the outer end of the bearing sleeve serves as a grease container for providing the desired lubrication for the wiper shaft 19. A wiper carrying arm 25, having a mounting substantially as that shown in the patent to John R. Oishei, granted June 26, 1928, No. 1,674,657, is carried by the shaft within the housing for supporting the wiper blade 26. A pair of retaining discs or flanges 27 may be arranged on opposite sides of the pinions 18 to guide the rack portions in their movements, one of such discs being removed in Fig. 2 for the sake of clearness.

In operation, the operating shaft 5 imparts an oscillatory travel to the crank pins 8, thereby reciprocating the rack bars and through the rack 110 and pinion connection 17, 18, the wipers 26 are given an arcuate path of travel over the windshield glass. In this connection, it will be noted that the travel of the crank pins in a horizontal direction, or lengthwise of the rack bars, gradually increases from the beginning of each stroke until a mid-way position, or when the crank pins reach the highest point in their arcuate paths of movement, and likewise, this horizontal travel is retarded as the crank pins approach their limits of movement. This is due to the ascendency and descendency of the pins toward and from a zenith point. Therefore, the reciprocation of the rack bars is such that the intermediate portion of the stroke is accelerated as compared with the terminal portions of the stroke, and this movement is in turn transmitted to the wipers by reason of the rack and pinion connections 17, 18. It will, however, be noted that this rack and pinion connection applies the driven force to the wiper shaft 19 always at a point substantially tangential to the pinion 18 with respect to the general path of movement of the reciprocating rack bars. This point of application to the pinion remains substantially constant while the reciprocatory motion of the rack bar is variable from a slow terminal movement to an accelerated intermediate action. Consequently, the wiper travel is accelerated across the central portion of the field of vision through which the motorist has the greatest vision, and is retarded terminally, giving the collected moisture a greater time interval to run down the wiper and off onto the uncleaned area of the windshield.

What is claimed is:

1. In a windshield cleaner, a wiper shaft, a pinion on the wiper shaft, a rack bar pivotally connected at one end to means for reciprocating it and having its opposite end slotted to receive said pinion, the one wall of the slot of said rack bar being provided with rack teeth meshing with the teeth of the pinion and the opposite wall of the bar slot being smooth and constituting a bearing surface in bearing contact with a portion of the pinion for maintaining the meshed engagement, said rack bar thus having pivotal and slidable support on said pinion, and bar retaining means carried by the wiper shaft for holding the rack bar against lateral displacement from the pinion.

2. In a windshield cleaner, a wiper operating shaft, a pinion fixed thereon and having a series of teeth and an arcuate bearing face, a reciprocatory bar for actuating the pinion, having at one end a guideway formed with a rack meshing with the pinion teeth and an opposed surface engaged with the bearing face of the pinion, and means connected to the opposite end of the bar for actuating the same.

3. In a windshield cleaner, an oscillatory actuating shaft having opposed crank pins, a bar pivoted on each pin for operating a wiper, said pins having recessed portions adjacent their free ends, a member extending between and having apertures receiving said pins, said member being disposed between the recessed portions and the bars, a locking element engaged with the recessed portions of both pins, and a lubricating pad engaging the pins and disposed between said member and the locking element, the latter serving to retain the bars, member and pad upon the pins.

4. In a windshield cleaner, an oscillatory actuating shaft having opposed crank arms, a crank pin adjacent the outer end of each arm and extending in the same direction therefrom, a bar for operating a wiper pivoted on each pin, and a retaining member extending between and connected to the outer ends of the pins for retaining the bars on the pins.

5. In a windshield cleaner, a wiper actuating shaft, a pinion operatively connected thereto, a rack bar for the pinion having its inner end pivotally connected to means for reciprocating it, the outer end of said rack bar being provided with a guideway receiving said pinion, one side of the guideway being provided with rack teeth meshing with the teeth of the pinion and the opposite side of the guideway having sliding bearing contact on the pinion, said rack bar being slidably and pivotally supported by the pinion.

6. In a windshield cleaner, an oscillatory actuating shaft having opposed crank arms, a crank pin adjacent the outer end of each arm, drive bars for operating wipers pivoted at their inner ends to the crank pins, said crank pins having recessed portions adjacent their free ends, and retaining means interlocked with the recessed portions of the pins for securing the bars on said pins.

HENRY HUEBER.